June 21, 1949.  A. TALOBRE  2,473,619
SPECTACLES WITH INTERCHANGEABLE LENSES
Filed Jan. 6, 1948

INVENTOR:

ANDRE TALOBRE

Patented June 21, 1949

2,473,619

UNITED STATES PATENT OFFICE 2,473,619

SPECTACLES WITH INTERCHANGEABLE LENSES

André Talobre, Oyonnax, France

Application January 6, 1948, Serial No. 719
In France September 16, 1947

1 Claim. (Cl. 88—47)

This invention deals with an improved type of spectacles with interchangeable lenses that allows the lenses of the spectacles to be changed at once and fastened in the rings of the frame with perfect safety by even a lay person.

It is one of the objects of the present invention to provide means for opening at a suitable spot each ring of the frame of spectacles and means for spreading apart from each other the edges of the gap so as to enlarge the ring sufficiently and to allow a lens to be easily and quickly changed, with the provision of any locking arrangement for holding the lens in place by joining together the edges of the opening or gap while the glasses are being used.

It is another object of the present invention to provide rings of the frame of spectacles which rings are opened at a point of their outer rim and include on each side of the gap or opening two lugs one of which forms a hinge on which is jointed the temples of the spectacle frame and the other takes the shape of a locking catch under which a corresponding part of the side of the spectacles fits for the purpose of ensuring the locking of the ring.

It is still another object of the present invention to provide split rings of the frame of spectacles, the locking catch of which projects slightly to the rear of the frame so as to ensure the locking of the ring even when the side is folded right back, while the unlocking of the ring is carried out then by a gentle forward push on the part of the ring that carries the catch so as to release the latter from the corresponding part of the side.

The accompanying drawings, that are given only as an example, illustrate a form of execution of the invention as carried out in practice. In said drawings.

Figure 1:
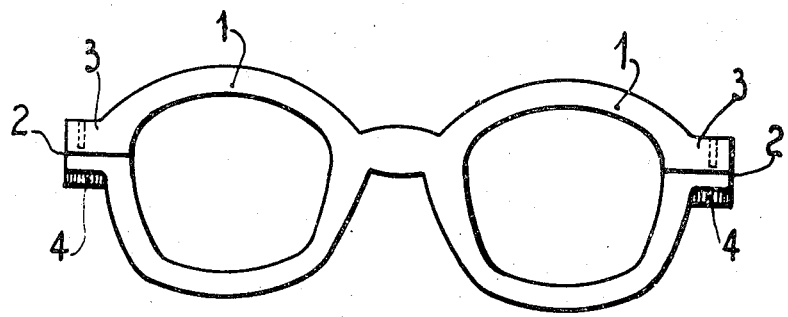
Fig. 1 is a front view of a pair of improved spectacles in accordance with the invention.
Figure 2:
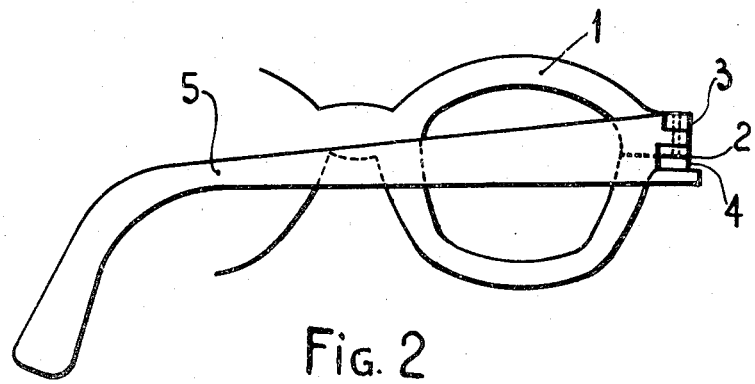
Fig. 2 is a part view taken from the back of the glasses.
Figure 3:
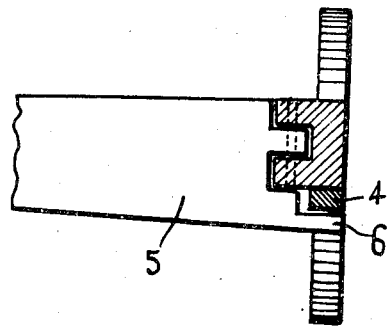
Fig. 3 is a detail view partly in section of the means for fastening a side, the frame being shown in profile and the side illustrated in its open position.

In the example illustrated in the drawing, each of the rings 1 of the frame shows a gap or opening 2 of which the edges may be spread apart merely by a gentle pull by reason of the flexible nature of the material of which the frame is made.

The edges of each opening 2 are formed by an upper lug 3 and a lower one 4 each lug being constituted by an extension of the ring 1. The upper lugs 3 form hinges to which are connected the sides 5 of the spectacles.

Each side 5 carries a lower extension 6 that fits under the lower lug 4 so as to force the latter to press closely against the upper lug 3, and this action takes place against the flexibility of the material that has a tendency to spread the lugs 3 and 4 apart.

The lower lug 4 slightly projects towards the rear of the ring 1, so that even when the side 5 is folded right back against the rear part of the frame (Fig. 4) the lower extension of the side still fits under the projection and thus holds the ring firmly closed.

Figure 4:
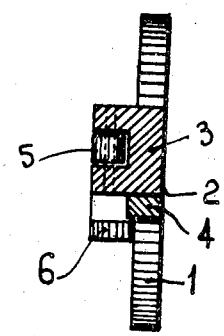
Fig. 4 is a view similar to Fig. 3 with the side shown in its closed position.

If the ring 1 has to be opened, for removing and replacing a lens, with the side 5 folded right back in the position as shown in Fig. 4, all that has to be done is to push lightly forward on the lower portion of the ring so as to loosen the rear projection 4a on lug 4 from the extension 6 of side 5. With the lug 4 perfectly free, the ring 1 will open up of its own accord through the action of the flexibility of the material. If need be, the edges of the opening 2 may be spread still further apart by pulling on them slightly to an extent such that the lens may come clear of the bezel or groove arranged in the ring, or on the other hand may be put back there.

It is obvious that the invention is not restricted to the example disclosed and illustrated.

If necessary, other ways and means for application of the invention may be adopted without unduly widening the scope of the invention as defined in accompanying claim.

Structural details and methods of assembly may also be modified to suit the conditions and demands for its adaptation in practice.

On the other hand, the various parts or means disclosed and illustrated only as examples, might be replaced by others that play the same part or give the same working result.

Use may also be made, of course, of any method, any material and any supplies adapted for suitable application in the manufacture of such types of spectacles.

What I claim is:

Spectacles adapted to receive interchangeable lenses comprising two rings rigid with one another and the outer lateral web of each of which rings is slotted throughout its breadth for allowing an elastic opening of the ring for replacement of the lenses, sides hingedly secured to the outer webs of the corresponding rings, two bosses rigid with each ring to either side of the slot and to one of which the corresponding side is pivotally secured and a projection on the pivoted end of each side adapted to engage the second boss on the corresponding ring for urging it against the first boss, said second bosses projecting slightly to the rear of the ring for ensuring the locking of the ring over the lens through cooperation with the side for all positions of the side and the release of the lens through the opening of the slot being provided through a slight forward elastic thrust exerted on the corresponding ring.

ANDRÉ TALOBRE.

REFERENCES CITED

The following references are of record in the file of this patent:

UNITED STATES PATENTS

| Number | Name | Date |
|---|---|---|
| 26,444 | Peckham | Dec. 13, 1859 |
| 1,736,951 | Welsh | Nov. 26, 1929 |
| 1,918,953 | Baker | July 18, 1933 |
| 2,350,338 | Casavant | June 6, 1944 |

FOREIGN PATENTS

| Number | Country | Date |
|---|---|---|
| 574,837 | France | Apr. 7, 1942 |